(12) United States Patent
Milbert

(10) Patent No.: US 7,263,206 B1
(45) Date of Patent: Aug. 28, 2007

(54) DIFFERENTIATING FRIEND FROM FOE AND ASSESSING THREATS IN A SOLDIER'S HEAD-MOUNTED DISPLAY

(75) Inventor: Randy L. Milbert, 4949 Diane Dr., Minnetonka, MN (US) 55343

(73) Assignee: Randy L. Milbert, Saint Paul, MN (US)

( * ) Notice: Subject to any disclaimer, the term of this patent is extended or adjusted under 35 U.S.C. 154(b) by 816 days.

(21) Appl. No.: 10/249,761

(22) Filed: May 6, 2003

Related U.S. Application Data

(60) Provisional application No. 60/379,434, filed on May 10, 2002.

(51) Int. Cl.
*G06K 9/00* (2006.01)

(52) U.S. Cl. .................. 382/103; 348/169; 345/8

(58) Field of Classification Search ............... 382/103, 382/107; 89/1.11; 340/995.21; 701/23, 701/26, 202, 205, 209, 210, 211, 301; 348/51, 348/52, 115, 169–172, 208.14; 342/6, 45, 342/176; 345/7–9, 32, 156, 157; 715/740, 715/744

See application file for complete search history.

(56) References Cited

U.S. PATENT DOCUMENTS

| | | | | |
|---|---|---|---|---|
| 4,267,562 A * | 5/1981 | Raimondi | ................ | 348/144 |
| 4,786,966 A * | 11/1988 | Hanson et al. | ........... | 348/158 |
| 5,001,488 A * | 3/1991 | Joguet | ..................... | 342/45 |
| 5,583,507 A * | 12/1996 | D'Isepo et al. | ............. | 342/45 |
| 5,788,500 A * | 8/1998 | Gerber | ..................... | 434/22 |
| 6,198,394 B1 * | 3/2001 | Jacobsen et al. | ......... | 340/573.1 |

* cited by examiner

*Primary Examiner*—Samir Ahmed
*Assistant Examiner*—Abolfazl Tabatabai
(74) *Attorney, Agent, or Firm*—Carlos R. Vilamar; Nixon Peabody, LLP

(57) ABSTRACT

A computer-implemented method for differentiating friendly and enemy units in a soldier's head-mounted display and warning a soldier when an enemy unit gains line-of-sight access to his or her position. The method includes a Unit Identifier (100) for associating units in aerial imagery with soldiers on the battlefield, a Commander Presenter (102) for presenting the aerial imagery and unit positions to a commander, a Unit Annotator (104) for enabling commanders to identify unknown units, and a Soldier Presenter (106) for identifying units that appear in a soldier's head-mounted display.

14 Claims, 10 Drawing Sheets

700 —

| Latitude | Longitude |
|---|---|
| 44.9210 | -93.4272 |
| 44.9276 | -93.4307 |

702 —

| Height | Width |
|---|---|
| 480 | 640 |

704 —

| Latitude Bottom | Latitude Top | Longitude Left | Longitude Right |
|---|---|---|---|
| 44.9317 | 44.9142 | -93.4331 | -93.4246 |

706 —

| Cursor X | Cursor Y |
|---|---|
| 44.9317 | 44.9142 |

708 —

| Type |
|---|
| Enemy |

Fig. 7

DIFFERENTIATING FRIEND FROM FOE AND ASSESSING THREATS IN A SOLDIER'S HEAD-MOUNTED DISPLAY

CROSS REFERENCE TO RELATED APPLICATIONS

This application claims the benefit of PPA Ser. No. 60/379,434, filed 2002 May 10 by the present inventor.

BACKGROUND OF INVENTION

1. Field of the Invention

This invention relates to image analysis, specifically to identifying friendly and enemy units in a soldier's head-mounted display.

2. Discussion of Prior Art

In September 2000, the U.S. Army performed the first operational test of the Land Warrior soldier system. The system connects soldiers on the battlefield via a wireless network. In addition, each Land Warrior carries a computer connected to a GPS receiver, scope video camera, and head-mounted display. The head-mounted display presents video from the scope camera attached to the soldier's weapon. As a result, the soldier can point his or her gun around a corner to assess enemy activity while minimizing exposure to attack.

A Land Warrior's head-mounted display serves as a targeting system. A soldier aims his or her weapon by placing a crosshair over an enemy unit in the scope video. In the heat of battle, however, it is difficult to quickly determine whether an individual is a friendly or enemy unit. As a result, friendly fire occurs in which a soldier accidentally fires on a fellow soldier.

To combat friendly fire, the present inventor developed a system that differentiates friend from foe in a soldier's head-mounted display. The system leverages position information reported by friendly soldiers. In addition, if aerial imagery of the battlefield is available, the system enables commanders to tag unknown individuals as friend, foe, or neutral.

Existing systems served as a foundation for the present invention. These existing systems are described below.

Tracking Objects in Video

The present invention relies on an object tracker to detect units in aerial imagery and scope video. Object trackers perform image analysis to locate, recognize, and follow objects in video sequences. Inventors have devised several suitable object trackers. For example:

U.S. Pat. No. 6,529,613 to Astle (2003) relies on image templates to determine the positions of objects in video.

U.S. Pat. No. 6,507,660 to Wirtz et al. (2003) uses a reference image and performs edge detection to identify objects in aerial imagery.

U.S. Pat. No. 6,542,621 to Brill et al. (2003) performs probabilistic analysis to deal with occlusion while tracking multiple objects in video sequences.

U.S. Pat. No. 6,434,254 to Wixson (2002) detects objects in video images using one method suitable for daytime scenes and a second method suitable for nighttime scenes.

The present invention builds on these object trackers by associating objects detected in aerial imagery with those detected in scope video. As a result, when a commander identifies an enemy unit in the aerial imagery, the present invention labels the corresponding unit in a soldier's scope video.

Determining an Object's Position

The present invention determines the position of unknown units in aerial imagery and uses this information to identify unknown units that appear in a soldier's scope video. Several existing systems use multiple cameras to determine the position of objects. For example:

U.S. Pat. No. 6,539,330 to Wakashiro (2003) determines the three-dimensional position of objects based on images from two cameras.

The present invention takes a different approach in determining the position of unknown units. The battlefield's topology restricts one dimension of movement for ground troops. For the remaining two dimensions, the present invention performs a calculation based on the unknown unit's position in an aerial image and the image's latitude and longitude extents. This technique enables the present invention to deduce the position of an unknown unit using a single camera.

Labeling Objects in Video

The present invention labels friendly and enemy units that appear in a soldier's head-mounted display. Similarly, several existing systems identify objects such as waypoints that appear in real-world images. For example:

U.S. Pat. No. 5,786,849 to Lynde (1998) identifies waypoints, obstacles, and targets that appear in marine navigation binoculars.

The present invention combines information about the position and orientation of a soldier's scope video camera with knowledge friendly and enemy unit locations to accurately label objects in a soldier's head-mounted display.

Differentiating Friend from Foe

In response to friendly fire incidents during the Gulf War, the U.S. Army launched a combat identification program. The program's goal was to equip soldiers with systems for differentiating friend from foe in combat. The result was an interrogator/transponder pair carried by each friendly unit. To determine whether a unit was a friend or foe, a soldier aimed his or her interrogator at the unit. For units carrying a properly configured transponder, the interrogator would indicate that the individual was a friend. Otherwise, the system deduced that the unit was an enemy.

The present invention has several advantages over combat identification systems that employ an interrogator and transponder. First, the present invention requires no equipment in addition to that already worn by Land Warriors. Second, the present invention requires to effort on the part of soldiers to differentiate friend from foe. The present invention automatically identifies units that appear in a soldier's scope video. As a result, the present invention enables soldiers to make rapid firing decisions.

PRIOR ART DISADVANTAGES

Existing systems for differentiating friend from foe in combat suffer from a number of disadvantages. Specifically, existing systems:

a. Delay firing decisions. Existing systems require that a soldier obtain line-of-sight access and initiate an identification sequence before determining whether a unit is a friend or foe. As a result, soldiers need to wait for units to come into view and to manually perform an interrogation before making a firing decision.

b. Fail to eliminate friendly fire. A soldier who improperly aims his or her interrogator or fires in the heat of battle before initiating an identification sequence may injure or kill fellow soldiers.
c. Fail to identify unknown units as friend, foe, or neutral. Although existing systems differentiate friendly units from unknown units, they cannot further classify unknown units as friend, foe, or neutral. As a result, soldiers must visually confirm at close range an enemy's identity.
d. Fail to provide advance warning when an enemy is approaching. Existing systems do not identify distant or obstructed units. As a result, soldiers are susceptible to surprise attack as enemy units suddenly come into view.
e. Require line-of-sight. To identify a unit using an existing system, a soldier must see his or her adversary. Unfortunately, a visible enemy unit may launch an attack before a friendly unit can initiate the identification sequence. As a result, existing systems place soldiers at risk of attack while they differentiate units.
f. Fail to expose hidden enemies. Existing systems require that a soldier obtain a clear view of an enemy before initiating the identification sequence. As a result, existing systems leave soldiers vulnerable to attack by obscured or distant enemies.
g. Require that soldiers carry interrogators and transponders. Land Warriors carry 90 pounds of equipment. The heavy load limits a soldier's range and maneuverability. Therefore, the U.S. Army would like to eliminate interrogators and transponders from combat identification systems.

OBJECTS AND ADVANTAGES

Accordingly, the objects and advantages of the present invention are to:
a. Enable rapid firing decisions by reducing the burden of obtaining line-of-sight access and performing interrogation to identify units.
b. Reduce friendly fire by eliminating the need to carefully aim and diligently use an interrogator to identify units.
c. Increase lethality by enabling commanders to tag enemy units appearing in aerial imagery and propagating this information to soldiers on the battlefield.
d. Increase survivability by identifying distant or unseen units, thereby reducing the risk of surprise attack.
e. Provide beyond-line-of-sight combat identification.
f. Expose enemies that are camouflaged, obscured, or outside of a soldier's visual range.
g. Eliminate the need to carry interrogators and transponders.
h. Reduce the risk of surprise attack by warning soldiers when an enemy unit gains line-of-sight access.
i. Avoid information overload when identifying many friendly and enemy units.

Further objects and advantages of the present invention will become apparent from a consideration of the ensuing description and drawings.

SUMMARY OF INVENTION

The present invention identifies friendly and enemy units in a soldier's head-mounted display. In addition, the system warns a soldier when an enemy unit has line-of-sight access to his or her position.

The present invention includes four processing components and one database. The Unit Identifier associates units in aerial imagery with soldiers on the battlefield. The Commander Presenter displays the aerial imagery and unit positions to a commander. The Unit Annotator enables commanders to identify unknown units as friend, foe, or neutral. The Soldier Presenter identifies units that appear in a soldier's head-mounted display. The Battlefield Database stores soldier identification and battlefield video.

The Unit Identifier determines the latitude and longitude of each object detected in an aerial image. If an object does not correspond to a soldier, the Unit Identifier adds a soldier at the object's position to the Battlefield Database.

The Commander Presenter determines the coordinates of each soldier in an aerial image. The Commander Presenter then draws on the aerial imagery an icon representing the soldier. Finally, the Commander Presenter displays the result to a commander.

The Unit Annotator determines which soldier a commander selected in the display. Based on a commander's selection, the Unit Annotator then updates the soldier's status as friend, foe, or neutral.

The Soldier Presenter associates objects detected in the scope video with units identified in the Battlefield Database. The Soldier Presenter then labels live units that appear in the scope video. In addition, the Soldier Presenter warns a soldier if an enemy unit has line-of-sight access to his or her position.

The Battlefield Database stores aerial imagery and scope video. In addition, Battlefield Database records the identities and positions of soldiers.

BRIEF DESCRIPTION OF DRAWINGS

FIG. 7: Unit Annotator Example

DETAILED DESCRIPTION

Figure 1:
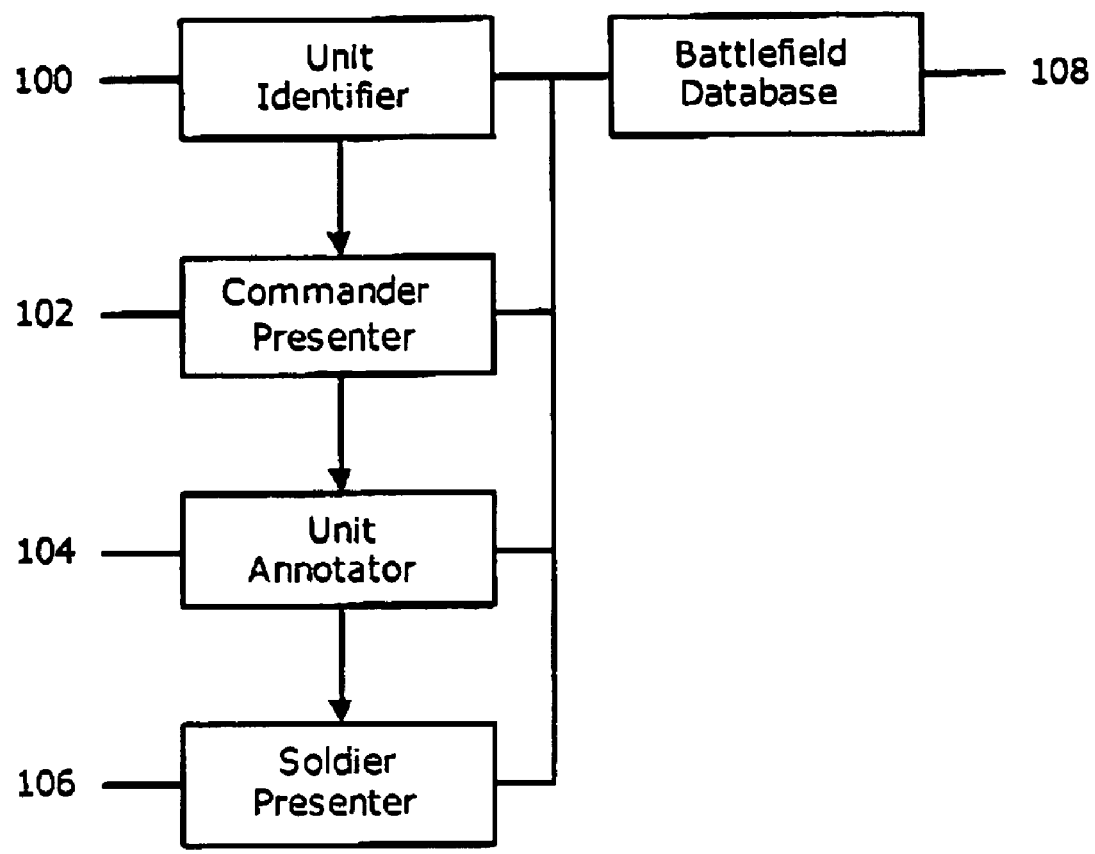
FIG. 1: Overall Method of Differentiating Friend From Foe and Assessing Threats in a Soldier's Head-Mounted Display

FIG. 1 shows a preferred embodiment of the present invention. The processing is performed by four components. The Unit Identifier 100 associates objects detected in aerial imagery with soldiers on the battlefield. The Commander Presenter 102 displays the aerial imagery and overlays symbols representing the soldiers. The Unit Annotator 104 enables commanders to tag soldiers as friend, foe, or neutral. The Soldier Presenter 106 identifies units that appear in a soldier's head-mounted display.

Each of the components has access to the Battlefield Database 108. The Battlefield Database 108 contains the position, name, orientation, rank, and type of each soldier. In addition, the Battlefield Database 108 contains aerial imagery of the battlefield and scope video captured by weapon-mounted cameras carried by soldiers. To perform line-of-sight analysis, the Battlefield Database 108 includes a standard Geographic Information System (GIS) such as MapInfo™ by ESRI, Inc. of Redlands, Calif.

The following sections describe the processing components and Battlefield Database 108 in detail.

Unit Identifier

Figure 2:
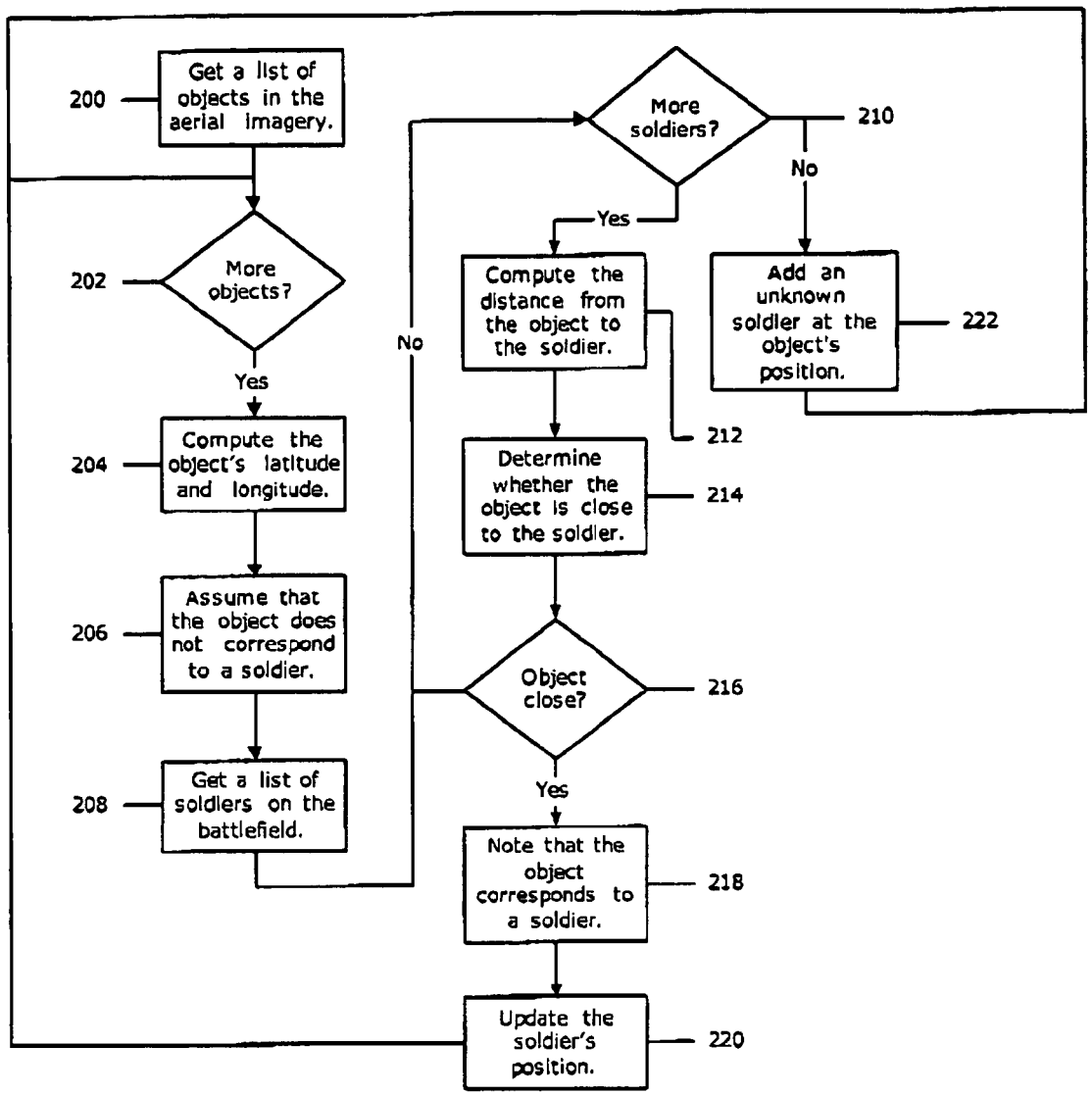
FIG. 2: Unit Identifier

FIG. 2 shows a preferred embodiment of the Unit Identifier 100. The Unit Identifier 100 begins at step 200 by retrieving a list of objects detected in an aerial image from the Battlefield Database 108. At step 202, the Unit Identifier 100 proceeds if there is at least one object in the aerial image. At step 204, the Unit Identifier 100 computes the current object's latitude and longitude using the following equations:

$$\text{Eq. 1:} \quad \text{Latitude} = \text{Top} + \frac{Y}{\text{Height}} * (\text{Bottom} - \text{Top})$$

$$\text{Eq. 2:} \quad \text{Longitude} = \text{Left} + \frac{X}{\text{Width}} * (\text{Right} - \text{Left})$$

Where "Top" is the top extent of the latitude depicted in the aerial image, "Y" is the y-coordinate of the object in the aerial image, "Height" is the height of the aerial image's latitude, "Bottom" is the bottom extent of the aerial image's latitude, "Left" is the left extent of the aerial image's longitude, "X" is the x-coordinate of the object in the aerial image, "Width" is the width of the aerial image, and "Right" is the right extent of the aerial image's longitude. At step 206, the Unit Identifier 100 assumes that the object does not correspond to a known soldier. At step 208, the Unit Identifier 100 gets a list of soldiers from the Battlefield Database 108. At step 210, the Unit Identifier 100 proceeds if there is at least one known soldier. At step 212, the Unit Identifier 100 computes the distance from the object to the current soldier using the following equation:

$$\text{Distance} = \sqrt{(\text{Lat}_o - \text{Lat}_s)^2 + (\text{Lon}_o - \text{Lon}_s)^2} \quad \text{Eq. 3}$$

Where "$\text{Lat}_o$" is the object's latitude, "$\text{Lat}_s$" is the current soldier's latitude, "$\text{Lon}_o$" is the object's longitude, and "$\text{Lon}_s$" is the current soldier's longitude. At step 214, the Unit Identifier 100 determines whether the object is close to the soldier by comparing the computed distance to a fixed proximity. At step 216, the Unit Identifier 100 proceeds if the object and soldier are close. At step 218, the Unit Identifier 100 notes that the object corresponds to a soldier. At step 220, the Unit Identifier 100 updates the soldier's position in the Battlefield Database 108 to match the object's latitude and longitude. The Unit Identifier 100 then returns to step 202 to continue iterating through the objects detected in the aerial image. If the Unit Identifier 100 determines at step 216 that the object and soldier are not close, it returns to step 210 to continue iterating through the list of soldiers. If there are no more soldiers remaining at step 210, the Unit Identifier 100 deduces that the object does not correspond to a known soldier. In that case, at step 222, the Unit Identifier 100 adds an unknown soldier to the Battlefield Database with the object's latitude and longitude. The Unit Identifier 100 then returns to step 202 to continue iterating through the objects detected in the aerial image.

Figure 3:
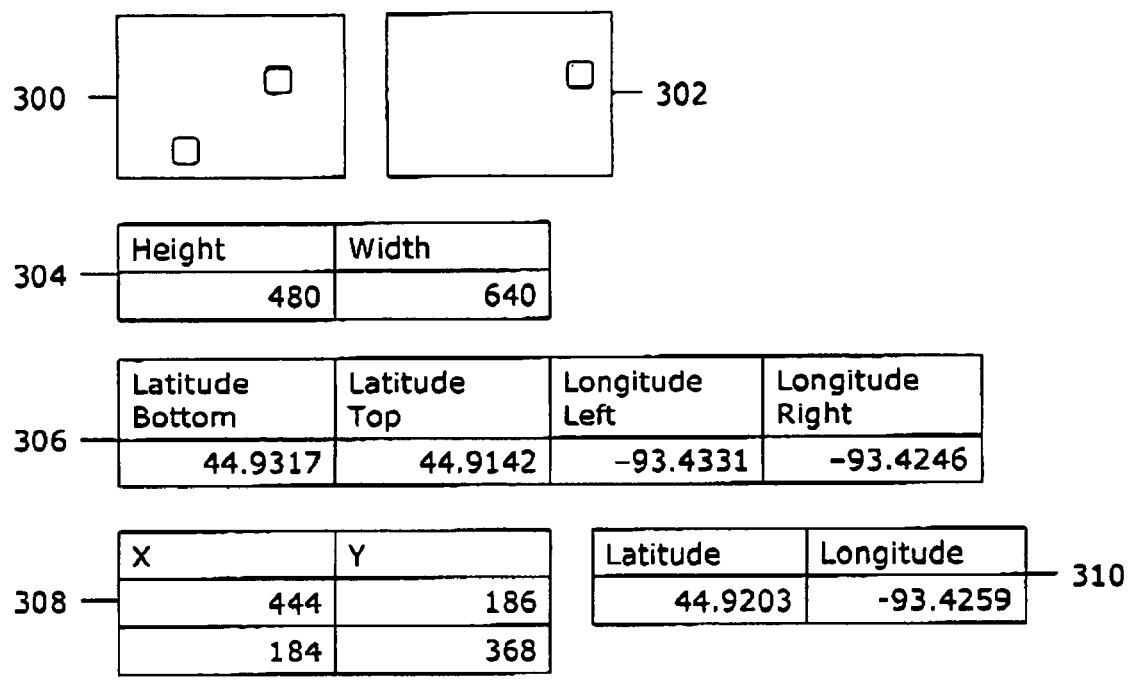
FIG. 3: Unit Identifier Example

To better understand the Unit Identifier 100, consider the example in FIG. 3. The diagram 300 shows the positions of two objects detected in an aerial image. The diagram 302 shows the position of one known soldier in the aerial image. To determine the correspondence between objects and soldiers, the Unit Identifier 100 begins by retrieving the aerial image dimensions 304 from the Battlefield Database 108. Next, the Unit Identifier 100 retrieves the latitude and longitude extents 306 of the aerial image. The Unit Identifier 100 then retrieves a list of objects 308 detected in the aerial image. In this case, the list contains two objects. Next, the Unit Identifier 100 computes the latitude and longitude of the first object as follows:

$$\text{Latitude}_1 = 44.9142 + \frac{186}{480} * (44.9317 - 44.9142) = 44.9210$$

$$\text{Longitude}_1 = -93.4331 + \frac{444}{640} * (-93.4246 - -93.4331) = -93.4272$$

Next, the Unit Identifier 100 retrieves a list of soldiers 310 from the Battlefield Database 108. In this case, the list contains one soldier. Next, the Unit Identifier 100 computes the distance between the first object and the soldier as follows:

$$\text{Distance}_1 = \sqrt{(44.9210 - 44.9203)^2 + (-93.4272 - -93.4259)^2} = 0.0015$$

The Unit Identifier 100 compares the computed distance to a fixed proximity to determine whether the object is close enough to correspond to the soldier. In this case, the Unit Identifier 100 will use a fixed distance of 0.0020. Therefore, the Unit Identifier 100 deduces that the object corresponds to the soldier and updates the soldier's position to match that of the object. Next, the Unit Identifier 100 computes the position of the second object as follows:

$$\text{Latitude}_2 = 44.9142 + \frac{368}{480} * (44.9317 - 44.9142) = 44.9276$$

$$\text{Longitude}_2 = -93.4331 + \frac{184}{640} * (-93.4246 - -93.4331) = -93.4307$$

Next, the Unit Identifier 100 computes the distance between the second object and the soldier as follows:

$$\text{Distance}_2 = \sqrt{(44.9276 - 44.9203)^2 + (-93.4307 - -93.4259)^2} = 0.0087$$

In this case, the object is not within the fixed proximity specified above, so the Unit Identifier 100 deduces that it is an unknown soldier. As a result, the Unit Identifier 100 adds an unknown soldier to the Battlefield Database 108 with a position that matches the object.

Commander Presenter

Figure 4:
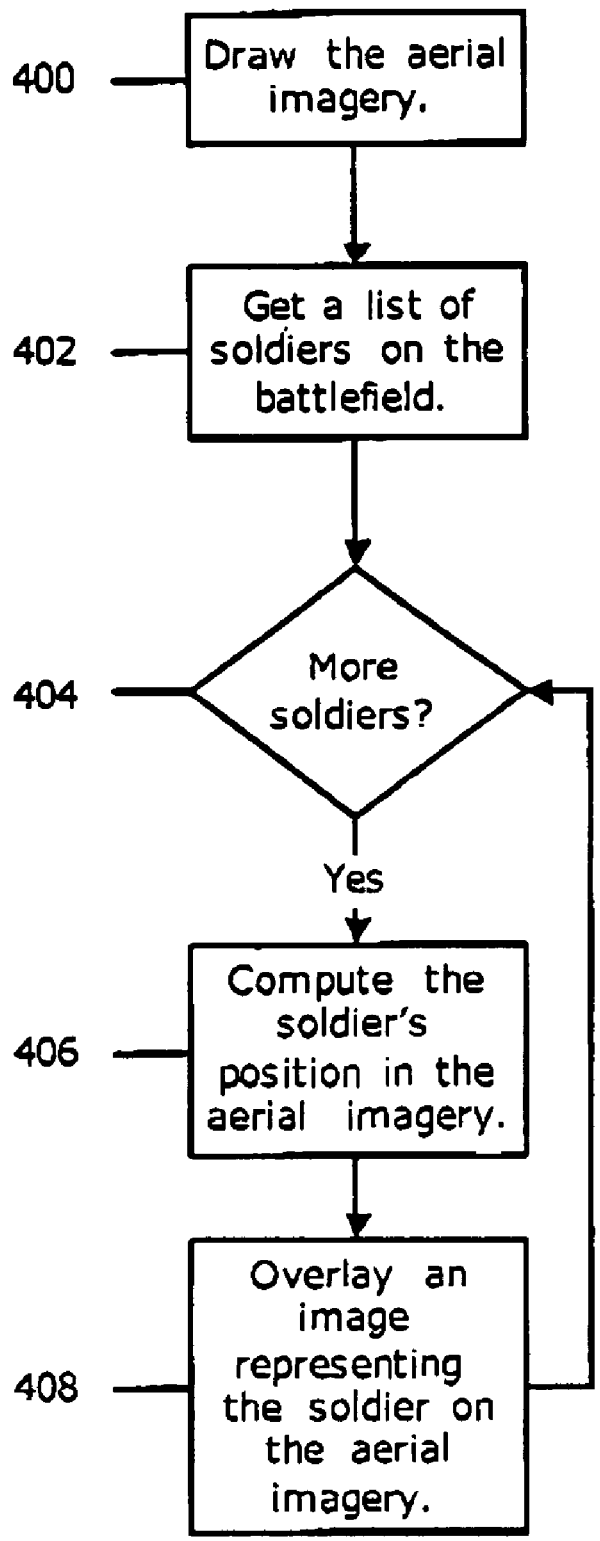
FIG. 4: Commander Presenter

FIG. 4 shows a preferred embodiment of the Commander Presenter 102. The Commander Presenter 102 begins at step 400 by retrieving an aerial image from the Battlefield Database 108 and drawing it on a display. At step 402, the Commander Presenter 102 retrieves a list of soldiers from the Battlefield Database 108. At step 404, the Commander Presenter 102 proceeds if there is at least one soldier in the list. At step 406, the Commander Presenter 102 computes the currents soldier's position in the aerial image using the following equation:

$$\text{Eq. 4:} \quad Y = \frac{(\text{Latitude} - \text{Top}) * \text{Height}}{\text{Bottom} - \text{Top}}$$

$$\text{Eq. 5:} \quad X = \frac{(\text{Longitude} - \text{Left}) * \text{Width}}{\text{Right} - \text{Left}}$$

Where "Latitude" is the soldier's latitude, "Longitude" is the soldier's longitude, and the remaining symbols are identical to those used in Eq. 1 and Eq. 2. At step 408, the Commander Presenter 102 retrieves the image associated with the soldier's type from the Battlefield Database 108. The Commander Presenter 102 then overlays the symbol on the aerial image at the position computed above. The Commander Presenter 102 continues until it has drawn all of the soldiers retrieved at step 402.

Figure 5:
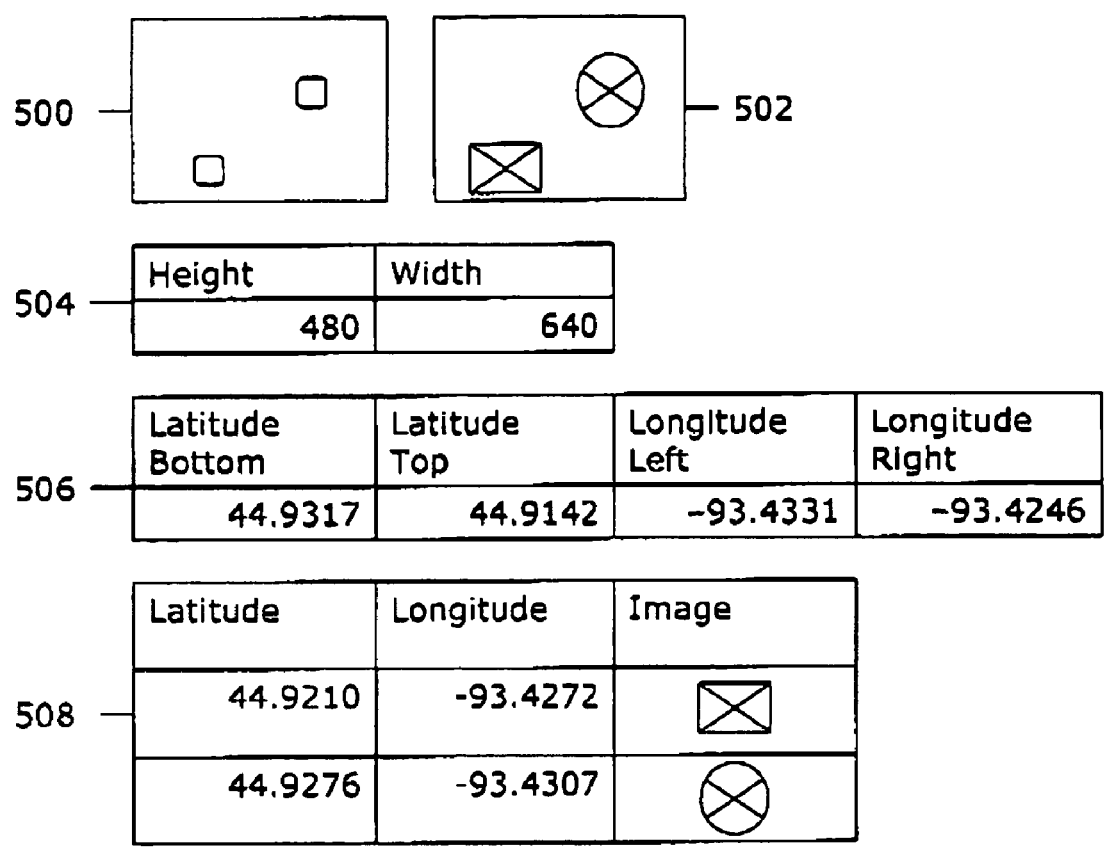
FIG. 5: Commander Presenter Example

To better understand the Commander Presenter 102, consider the example in FIG. 5. The Commander Presenter 102 begins by retrieving an aerial image 500 from the Battlefield Database 108 and drawing it on the display. Next, the Commander Presenter 102 retrieves the display dimensions 504 from the Battlefield Database 108. Next, the Commander Presenter 102 retrieves the latitude and longitude extents 506 of the aerial image. Next, the Commander Presenter 102 retrieves a list of soldiers 508. In this case, the list contains two soldiers. Each record contains the latitude and longitude of a soldier as well as a symbol representing the soldier. Next, the Commander Presenter 102 computes the positions of the soldiers in the display as follows:

$$Y_1 = \frac{(44.9210 - 44.9142) * 480}{44.9317 - 44.9142} = 186$$

$$X_1 = \frac{(-93.4272 - -93.4331) * 640}{-93.4246 - -93.4331} = 444$$

$$Y_2 = \frac{(44.9276 - 44.9142) * 480}{44.9317 - 44.9142} = 368$$

$$X_2 = \frac{(-93.4307 - -93.4331) * 640}{-93.4246 - -93.4331} = 181$$

Finally, the Commander Presenter 102 draws the symbols on the aerial image at the positions computed above and updates the display.

Unit Annotator

Figure 6:
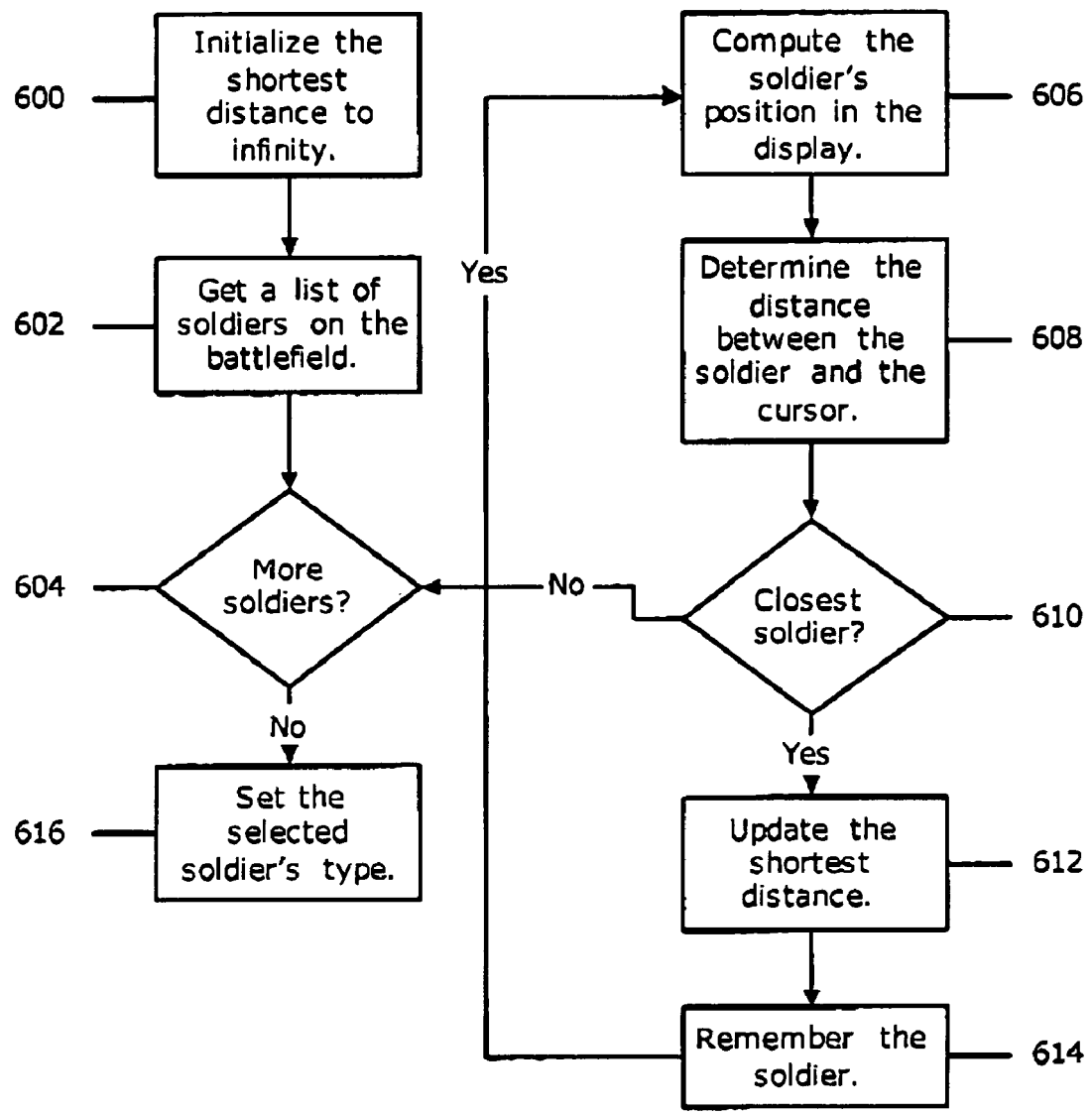
FIG. 6: Unit Annotator

FIG. 6 shows a preferred embodiment of the Unit Annotator 104. The Unit Annotator 104 begins at step 600 by initializing to infinity a variable that stores the shortest distance between the cursor and a soldier displayed in the aerial image. At step 602, the Unit Annotator 104 gets a list of soldiers from the Battlefield Database 108. At step 604, the Unit Annotator 104 proceeds if there is at least one soldier in the list. At step 606, the Unit Annotator 104 computes the current soldier's position in the display using Eq. 4 and Eq. 5. At step 608, the Unit Annotator 104 retrieves the cursor position from the Battlefield Database 108 and then computes the distance between the soldier and the cursor in the display using the following equation:

$$\text{Distance} = \sqrt{(X_C - X_S)^2 + (Y_C - Y_S)^2} \qquad \text{Eq. 6}$$

Where "$X_C$" is the cursor's x-coordinate, "$X_S$" is the current soldier's x-coordinate, "$Y_C$" is the cursor's y-coordinate, and "$Y_S$" is the current soldier's y-coordinate. At step 610, the Unit Annotator 104 proceeds if the computed distance is the shortest so far. At step 612, the Unit Annotator 104 updates the variable that stores the shortest distance between the cursor and a soldier. At step 614, the Unit Annotator 104 stores the closest soldier for later recall. If the Unit Annotator 104 determines at step 610 that another soldier is closer to the cursor, it returns to step 604 and continues iterating through the soldiers. The Unit Annotator 104 continues until it has computed the distance between each soldier and the cursor and determines the closest one. Then, at step 616, the Unit Annotator 104 sets the closest soldier's status as friend, foe, or neutral to the value specified by a commander.

To better understand the Unit Annotator 104, consider the example in FIG. 7. The Unit Annotator 104 begins by retrieving a list of soldiers 700 from the Battlefield Database 108. Next, the Unit Annotator 104 retrieves the display dimensions 702 as well as the latitude and longitude extents 704 of the aerial image. Next, the Unit Annotator 104 retrieves the cursor's coordinates 706. Next, the Unit Annotator 104 computes the x- and y-coordinates of the soldiers in the display as in the Commander Presenter 102 example. Next, the Unit Annotator 104 computes the distance between each soldier and the cursor as follows:

$$\text{Distance}_1 = \sqrt{(178-444)^2 + (370-186)^2} = 323$$

$$\text{Distance}_2 = \sqrt{(178-181)^2 + (370-368)^2} = 4$$

By comparing the distances, the Unit Annotator 104 deduces that the user selected the second soldier. Therefore, the Unit Annotator 104 sets the type of the second soldier to match the type 708 specified by the commander.

Soldier Presenter

Figure 8:
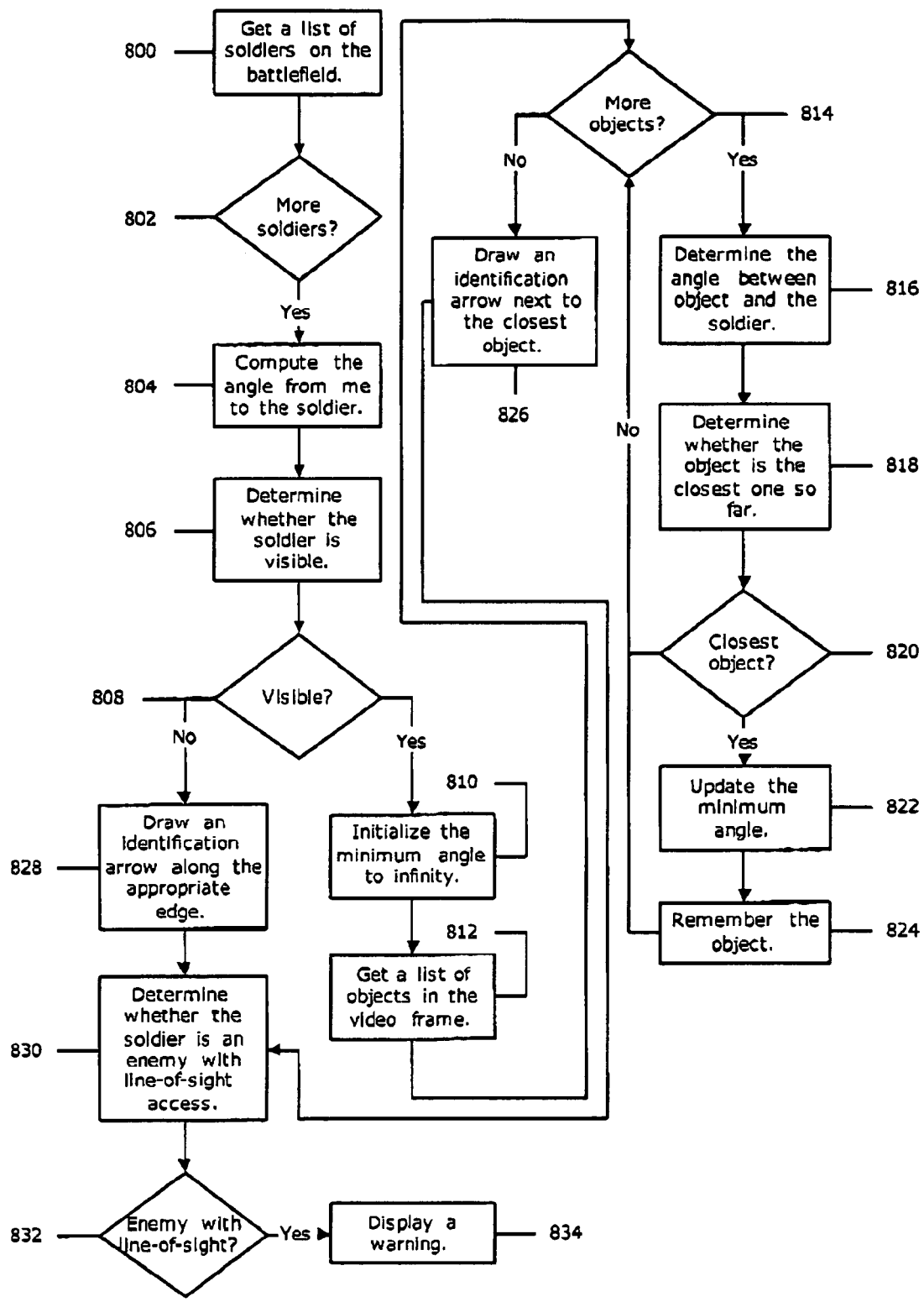
FIG. 8: Soldier Presenter

FIG. 8 shows a preferred embodiment of the Soldier Presenter 106. The Soldier Presenter 106 begins at step 800 by retrieving a list of soldiers from the Battlefield Database 108. At step 802, the Soldier Presenter 106 proceeds if there is at least one soldier in the list. At step 804, the Soldier Presenter 106 computes the angle from the viewer's location to the current soldier using the following equation:

$$\text{Angle}_s = \tan^{-1}(\text{Lon}_v - \text{Lon}_s, \text{Lat}_v - \text{Lat}_s) \qquad \text{Eq. 7}$$

Where "$\text{Lon}_v$" is the viewer's longitude, "$\text{Lon}_s$" is the current soldier's longitude, "$\text{Lat}_v$" is the viewer's latitude, and "$\text{Lat}_s$" is the current soldier's latitude. At step 806, the Soldier Presenter 106 uses the following inequality to determine whether the current soldier is visible in the viewer's head-mounted display:

$$\text{Eq. 8:} \quad \text{Angle}_s - \text{Orientation} < \frac{\text{FieldOfView}}{2}$$

Where "Orientation" is the viewer's orientation and "FieldOfView" is angle covered by the viewer's scope video camera. If the inequality holds, the current soldier is visible. At step 808, the Soldier Presenter 106 proceeds if the current soldier is visible in the scope video frame. At step 810, the Soldier Presenter 106 initializes to infinity the variable indicating the minimum angle between an object detected in the scope video frame and the current soldier. At step 812, the Soldier Presenter 106 gets a list of objects detected in the scope video frame from the Battlefield Database 108. At step 814, the Soldier Presenter 106 proceeds if there is at least one object in the list. At step 816, the Soldier Presenter 106 determines the angle between the object and current soldier using the following equation:

$$\text{Eq. 9:} \quad \text{Angle}_O = \frac{\left(X_O - \frac{\text{Width}}{2}\right) * \text{FieldOfView}}{\text{Width}} + \text{Orientation}$$

Where "$X_O$" is the x-coordinate of the object in the scope video frame and "Width" is the width of the scope video frame. At step 818, the Soldier Presenter 106 compares the computed angle to the variable indicating the minimum angle between an object and the current soldier. At step 820, the Soldier Presenter 106 proceeds if the current object is the closest one so far. At step 822, the Soldier Presenter 106 sets the minimum angle to the computed angle. At step 824, the Soldier Presenter 106 stores the current object for later recall. The Soldier Presenter 106 then returns to step 814 to continue searching for a closer object. If the Soldier Presenter 106 determines at step 820 that the current object is farther from the soldier than a previously examined object, it returns to step 814 to analyze the remaining objects. When there are no more objects to inspect at step 814, the Soldier Presenter 106 draws an identification arrow in the scope video frame at the closest object's position. If the soldier's name and rank are available in the Battlefield Database 108, the Soldier Presenter 106 draws them next to the arrow. In addition, the Soldier Presenter 106 colors the arrow to reflect the current soldier's status as friend, foe, neutral, or unknown. At step 830, the Soldier Presenter 106 uses the GIS capabilities of the Battlefield Database 108 to determine whether the current soldier is an enemy with line-of-sight access to the viewer's location. At step 832, the Soldier Presenter 106 proceeds if the current soldier is an enemy with line-of-sight access. At step 834, the Soldier Presenter 106 displays a warning in the viewer's scope video frame indicating that an enemy unit has line-of-sight access. If the Soldier Presenter 106 determines at step 808 that the soldier is not visible, it continues to step 828. At step 828, the Soldier Presenter 106 draws an identification arrow along the appropriate edge of the scope video frame. To determine the appropriate edge, the Soldier Presenter 106 uses the following inequality:

$$\text{Angle}_s - \text{Orientation} > 0 \quad \text{Eq. 10}$$

If the inequality holds, the current soldier appears to the viewer's right. Otherwise, the current soldier appears to the viewer's left. If there are more than a fixed number of arrows along the edge of the screen, the Soldier Presenter 106 collapses them into a single symbol to avoid information overload. After drawing the identification arrow, the Soldier Presenter 106 continues to step 830 and executes as described above.

Figure 9:
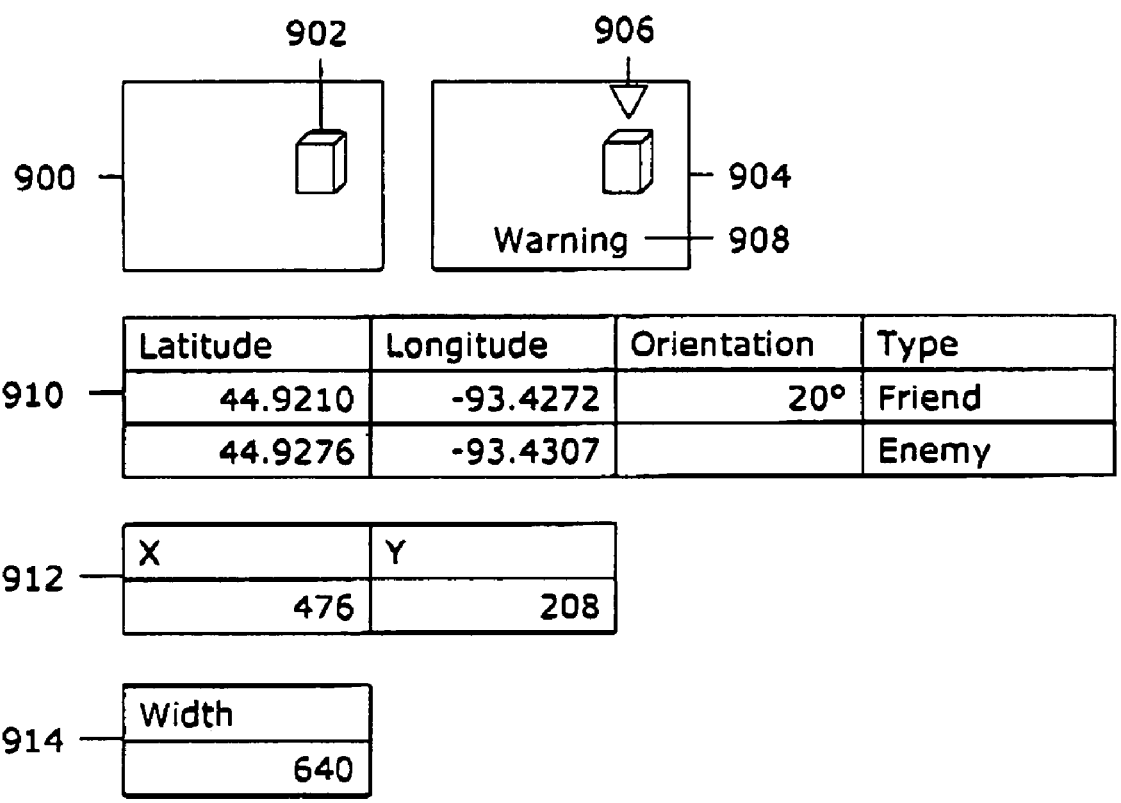
FIG. 9: Soldier Presenter Example

To better understand the Soldier Presenter 106, consider the example in FIG. 9. The Soldier Presenter 106 begins by retrieving a frame 900 from the viewer's scope video. The frame 900 shows an object 902 that the Soldier Presenter 106 will identify as an enemy unit. The Soldier Presenter 106 retrieves a list of soldiers 910 from the Battlefield Database 108. In this case, the list contains two soldiers. The first soldier is the viewer, so the Soldier Presenter 106 will identify the second soldier in the scope video frame 900. To do so, the Soldier Presenter 106 determines the angle from the viewer to the second soldier as follows:

$$\text{Angle}_s = \tan^{-1}(-93.4307 - 93.4272, 44.9210 - 44.9276)$$
$$= 28°$$

Next, the Soldier Presenter 106 determines whether the soldier is visible using the following inequality (where the field of view is set to a typical value of 160°):

$$28° - 20° < \frac{160°}{2}$$

The inequality holds, so the Soldier Presenter 106 deduces that the soldier is visible. Next, the Soldier Presenter 106 retrieves the list of objects 912 detected in the scope video frame from the Battlefield Database 108. In this case, the list contains one object. The Soldier Presenter 106 also retrieves the width 914 of the scope video frame. The Soldier Presenter 106 computes the angle between the viewer and the object as follows:

$$\text{Angle}_O = \frac{\left(476 - \frac{640}{2}\right) * 160°}{640} + 20° = 59°$$

There is only one object, so the Soldier Presenter 106 deduces that it corresponds to the soldier. As a result, the Soldier Presenter 106 updates the display 904 by drawing an arrow 906 identifying the object. The soldier is an enemy, so the Soldier Presenter 106 continues by determining whether has line-of-sight access to the viewer's location. The Battlefield Database 108 indicates that it does, so the Soldier Presenter 106 displays a line-of-sight warning 908.

Battlefield Database

Figure 10:
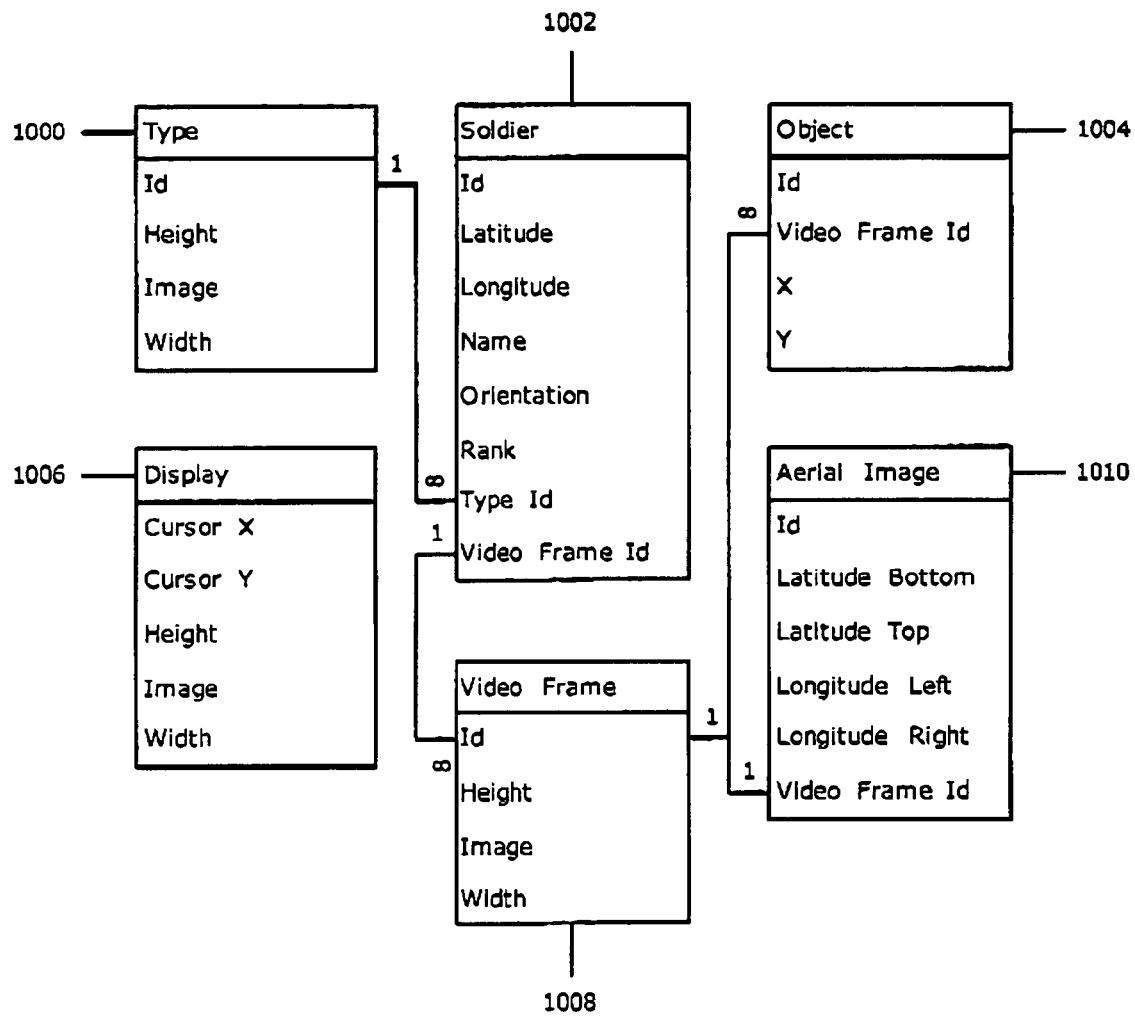
FIG. 10: Battlefield Database

FIG. 10 shows a preferred embodiment of the Battlefield Database 108. The Battlefield Database 108 includes a Type table 1000 for categorizing soldiers as friend, foe, neutral, or unknown; a Soldier table 1002 for locating and identifying soldiers; an Object table 1004 for recording objects detected in video frames; a Display table 1006 for presenting user interfaces to commanders and soldiers; a Video Frame table 1008 for storing aerial imagery and scope video; and an Aerial Image table 1010 for geographically registering aerial imagery.

The Type table 1000 classifies soldiers as friend, foe, neutral, or unknown. For each classification, the Type table 1000 contains an image representing the type. To facilitate displaying type information, the Type table 1000 also specifies the width and height of the images.

The Soldier table 1002 locates and identifies soldiers on the battlefield. It specifies a soldier's latitude and longitude, name, orientation, and rank. In addition, the Soldier table 1002 specifies the soldier's type by linking to the Type table 1000 and records scope video by linking to the Video Frame table 1008.

The Object table 1004 represents objects detected in aerial imagery or scope video. It indicates the x- and y-coordinates of an object in a video frame. In addition, the Object table 1004 links to the appropriate video frame in the Video Frame table 1008.

The Display table 1006 facilitates presentation of user interfaces. It contains an image that is visible to commanders and soldiers. To aid in drawing on the image, the Display table 1006 specifies its width and height. In addition, the Display table 1006 specifies the x- and y-coordinates of the cursor used by commanders to select soldiers appearing in aerial images.

The Video Frame table 1008 represents frames of aerial imagery or scope video. It includes an image and specifies the image's dimensions.

The Aerial Image table 1010 indicates the position of aerial images on the globe. It specifies the bottom and top extents of an aerial image's latitude as well as the left and right extents of the aerial image's longitude. The Aerial Image table 1010 also links to the appropriate image in the Video Frame table 1008.

Advantages

From the description above, a number of advantages of the present invention become evident. Specifically, the present invention:

a. Enables rapid firing decisions. The present invention automatically and immediately identifies friendly and enemy units in a soldier's head-mounted display. There is no need for the soldier to obtain line-of-sight access to the unit or initiate an identification sequence.

b. Reduces friendly fire. Without any interaction on the part of a soldier, the present invention indicates the position and displays the name and rank of each friendly unit in the soldier's head-mounted display. As a result, soldiers can immediately identify units and avoid friendly fire.

c. Increases lethality. The present invention enables commanders to identify unknown units in aerial imagery as friend, foe, or neutral. The present invention propagates this information to soldiers, thereby enabling them to fire on distant enemy units and wage surprise attacks.

d. Increases survivability. The present invention indicates the positions of distant and unseen enemy units. As a result, friendly soldiers have advance warning when an enemy approaches and are less susceptible to surprise attack.

e. Provides beyond-line-of-sight combat identification. The present invention enables soldiers to determine the positions of friendly and enemy units even when buildings, weather, or distance obstructs them. As a result, soldiers can anticipate enemy attacks and are less likely to reflexively fire when a friendly unit strafes into view.

f. Exposes enemies that are camouflaged, obscured, or outside of a soldier's visual range. The present reveals the positions of hidden enemy units thereby enabling soldiers to anticipate enemy attacks.

g. Eliminates the need to carry interrogators and transponders. Unlike combat identification systems, the present invention does not rely on interrogators and transponders to differentiate friend from foe. Instead, the present invention enables Land Warriors to use their existing equipment to identify units.

h. Reduces the risk of surprise attack. The present invention warns a soldier when an enemy unit gains line-of-sight access. As a result, friendly units can anticipate an enemy attack and avoid ambush.

i. Avoids information overload. The present invention collapses the identification of multiple units into a single symbol, thereby ensuring that information in a soldier's head-mounted display is manageable.

The invention claimed is:

1. A method for differentiating friend from foe and assessing battlefield threats, said method comprising:

identifying objects detected in aerial image as friendly units or unknown units based on the reported positions of said friendly units;

allowing manual classification of said unknown units as friend, foe, or neutral;

identifying objects detected in scope video based on the positions of said friendly units and said unknown units as well as the position and orientation of the scope video camera; and warning a soldier if said unknown units classified as foes have line-of-sight access to said positions of said friendly units.

2. The method of claim 1, further comprising presenting the positions of said friendly units and said unknown units in said aerial image.

3. The method of claim 1, wherein the step of identifying objects detected in scope video includes:

presenting the name or rank of said friendly units;

indicating the position of and direction to said friendly units and unknown units; and indicating said classification of said unknown units.

4. The method of claim 1, further comprising implementing said method with a computer readable medium including one or more computer readable instructions embedded on the computer readable medium and configured to cause one or more computer processors to perform the steps of said method.

5. The method of claim 1, further comprising implementing said method with one or more hardware and software devices.

6. A system for differentiating friend from foe and assessing battlefield threats, said system comprising:

a unit identifier for identifying objects detected in aerial image as friendly units or unknown units based on the reported positions of said friendly units;

a unit annotator for allowing manual classification of said unknown units as friend, foe, or neutral; and a soldier presenter for identifying objects detected in scope video based on the positions of said friendly units and said unknown units as well as the position and orientation of the scope video camera, wherein said soldier presenter includes warning a soldier if said unknown units classified as foes have line-of-sight access to said positions of said friendly units.

7. The system of claim 6, further comprising a commander presenter for presenting the positions of said friendly units and said unknown units in said aerial image.

8. The system of claim 6, wherein said soldier presenter includes:

means for presenting the name or rank of said friendly units;

means for indicating the position of and direction to said friendly units and unknown units; and means for indicating said classification of said unknown units.

9. The system of claim 6, wherein said system is implemented with one or more hardware and software devices.

10. A method of identifying a plurality of objects, said method comprising:

receiving the positions of a first subset of said objects;

receiving a ground image depicting a second subset of said objects;

receiving the position and orientation of the device that captured said ground image;

receiving the coordinates of objects in said second subset within said ground image;

determining the correspondence among objects in said first subset and said second subset;

determining a first set of angles between said device and objects in said first subset;

determining a second set of angles between said device and objects in said second subset; and comparing said first set of angles and said second set of angles.

11. The method of claim 10, wherein said objects are units on a battlefield, said first subset contains friendly units reporting their positions, and said device is a weapon-mounted video camera.

12. The method of claim 10, further comprising:

receiving an aerial image depicting a third subset of said units;

determining the correspondence among said friendly units and units in said third subset;

allowing manual classification of units in said third subset as friend, foe, or neutral; and identifying said units in said ground image.

13. The method of claim 10, further comprising implementing said method with a computer readable medium including one or more computer readable instructions embedded on the computer readable medium and configured to cause one or more computer processors to perform the steps of said method.

14. The method of claim 10, further comprising implementing said method with one or more hardware and software devices.

* * * * *